No. 706,924. Patented Aug. 12, 1902.
C. E. GERVAIS.
LAMP.
(Application filed Apr. 17, 1902.)
(No Model.)

WITNESSES:
Walter Wollheim
C. Bradway.

INVENTOR
Charles E. Gervais,
BY
Goepel & Niles,
ATTORNEYS

UNITED STATES PATENT OFFICE.

CHARLES E. GERVAIS, OF NEW YORK, N. Y., ASSIGNOR TO GERVAIS MANUFACTURING COMPANY, OF NEW YORK, N. Y., A CORPORATION OF NEW YORK.

LAMP.

SPECIFICATION forming part of Letters Patent No. 706,924, dated August 12, 1902.

Application filed April 17, 1902. Serial No. 103,364. (No model.)

*To all whom it may concern:*

Be it known that I, CHARLES E. GERVAIS, a citizen of the United States, residing in New York, borough of Manhattan, in the State of New York, have invented certain new and useful Improvements in Lamps, of which the following is a specification.

In United States Patent No. 678,655, granted to me July 16, 1901, I have shown a lamp in which the wick was ignited by means of a resistance-wire heated by an electric current passing through the same, said current being generated by an electric battery contained in a suitable receptacle on which the lamp was supported. In further carrying out this same type of lamp it was found desirable to dispense with one of the two wicks, employ a burner of the type adapted to support a globe, and attach the lamp-body to the receptacle, so that the whole should form one integral connected structure, the extinguishing device shown in said patent being omitted. It was also found desirable to so arrange the igniting-wire that the same should not interfere with the flame from the wick and should be so located as to be out of the way when trimming the wick and as not to be readily displaced. The employment of a burner of the screw type and a stationary lamp-body necessitated a contact device between the same of such form as to permit ready removal and replacement of the burner. These objects are attained by certain details of construction and combinations of parts, which will be fully described hereinafter and finally pointed out in the claims.

Figure 1:
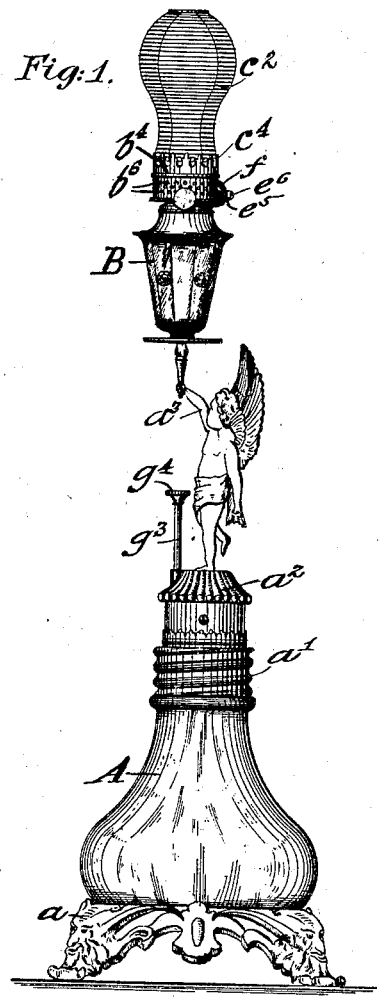
Figure 2:
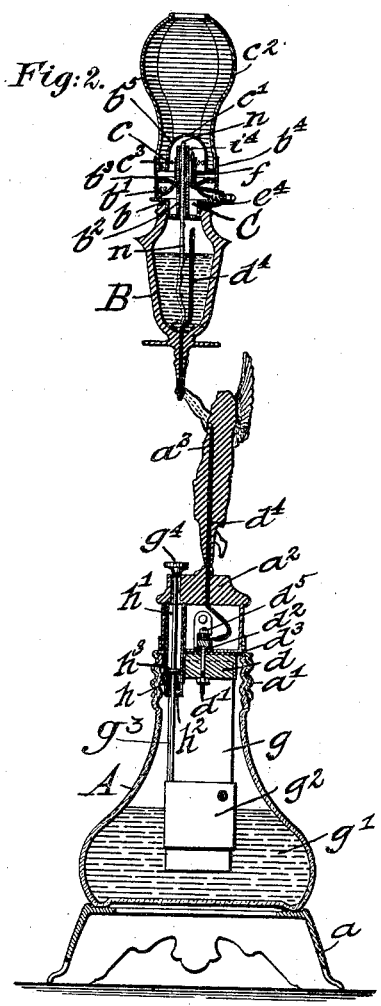
Figure 3:
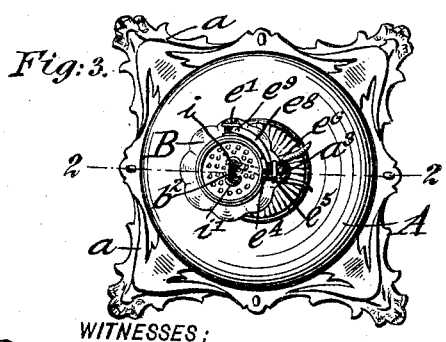
Figure 4:
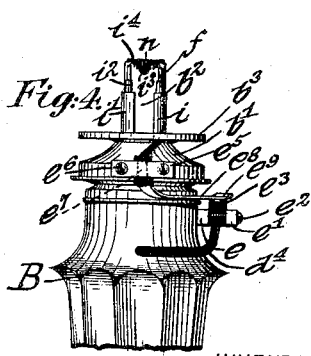

In the accompanying drawings, Figure 1 is a side elevation of a lamp embodying my invention. Fig. 2 is a vertical central section on line 2 2, Fig. 3. Fig. 3 is a top view of the lamp; and Fig. 4 is a detail side view, on a larger scale, of the burner and upper portion of the lamp, showing the contact device.

Similar letters of reference indicate corresponding parts.

Referring to the drawings, A indicates a suitable receptacle mounted on a base $a$ and adapted to contain a suitable battery fluid. The receptacle A is provided with a screw-cap $a'$, and from the head $a^2$ of said cap extends in upward direction a support or stem $a^3$ of any suitable ornamental form. At the upper end of the stem is located the fuel-receptacle or lamp-body B, having an open upper end, into which is screwed the burner C. The body or shell of the burner is screw-threaded at its lower portion $b$ and upwardly inclined at its upper portion $b'$, so as to deflect the entering air in upward direction toward the wick and the igniting-wire arranged above the portion $b'$, as hereinafter described, so as to aid the combustion and cool the resistance-wire. A wick-tube $b^2$ of flat or other suitable shape passes vertically through the shell $b$ $b'$ of the burner. On the upper part $b'$ of the burner and surrounding the wick-tube is located a perforated screen-plate $b^3$. Over the screen-plate and wick-tube is the burner-crown $b^4$ of the usual construction, provided with perforations $b^6$ in its side wall below the plate $b^3$. The dome $b^5$ of the crown is provided with the usual side perforations $c$ and top opening $c'$ for the flame. A chimney $c^2$ is supported on the gallery $c^3$ of the dome and retained in position by the usual spring-tongues $c^4$. A plug $d$ is located below the cap $a'$ and secured thereto by a bolt $d'$, passing through the cap and plug. Insulating-washers $d^2$ $d^3$ insulate the plug and bolt from the cap; but the bolt is in contact with the plug. The head of the bolt is provided with a bore for receiving the end of a conducting-wire $d^4$ and with a set-screw $d^5$ for securing the same. The wire $d^4$ is insulated and extends through the stem $a^3$ in upward direction, then into the lamp-body B, and out through the wall of the same above the level of the fuel. From the lamp-body the wire $d^4$ passes to the contact device. The lower member of the contact device is composed of a base $e$, soldered or otherwise secured in horizontal position on the lamp-body, a horizontal clamping-plate $e'$, two clamping-screws $e^2$, securing the clamping-plate to the base, and a contact piece in the form of a vertically-arranged headed pin or stud $e^3$, provided at its sides with insulation and adapted to be clamped between the base and plate and extending upwardly from the same. The conducting-wire $d^4$ is soldered or otherwise secured to the insulated contact-piece $e^3$ and extends from the lower end of the same. The upper or burner member of the contact device is composed of a base $e^4$, secured in horizontal position on the burner, (the crown $b^4$ being cut away to accommodate the same, as shown in Fig. 2,) a clamping-plate $e^5$, clamping-screws $e^6$, securing the clamping-plate to the base, and a contact-piece in the form of an angularly-bent piece of spring metal, such as spring-brass, one portion $e^7$ of which is provided with insulating material and clamped in position vertically, or approximately so, between the base $e^4$ and plate $e^5$, and the other portion $e^8$ of which extends horizontally, or nearly so, from the lower end of said vertical portion and is curved concentrically with the burner, so as to form contact with the lower contact-piece $e^3$. It is preferably provided at its outer end with an upturned heel $e^9$, which when the burner is turned so that the heel is in contact with the lower contact-piece $e^3$, as in Fig. 3, serves to retard unscrewing movement of the burner. By loosening the lower clamping-screws the lower contact-piece $e^3$ can be raised or lowered. By loosening the upper contact-screws the upper contact-piece can be similarly adjusted. These adjustments permit the contact-pieces to be set so as to make reliable contact when the burner is screwed into the lamp-body. The vertical portion $e^7$ of the upper contact-piece can be clamped either in vertical position or in case the lower portion is desired slightly inclined or should become bent in upward direction, so as not to make contact, may be clamped in inclined position, so that reliable contact is made.

An insulated conducting-wire $f$ is soldered or otherwise attached to the upper portion $e^7$ of the upper contact member and extends inwardly through the crown and upwardly through the screen-plate $b^3$. A vertical guard $i$, preferably of semicircular form, is attached to the wick-tube $b^2$ for supporting and protecting the conductor $f$ and preventing displacement of the same. The conductor extends upwardly through said guard and out at the upper end of the same, where the insulation is removed, as indicated in Fig. 4. Adjacent said guard $i$ is arranged a post $i^2$, made of conducting material, and also attached to the wick-tube, preferably by a similar guard $i'$, so as to be prevented from being displaced. The side wall of the wick-tube is provided between the upper ends of the conducting-wire and post with a downwardly-extending notch $i^3$, whereby the side of the wick $n$ below the top of the same is exposed. A resistance-wire $i^4$, of platinum or other suitable material, extends between the upper ends of the wire $f$ and post $i^2$ into contact with the wick at said notch. The resistance-wire may not make actual contact with the wick, but is located very closely thereto, so that the reliable lighting of the wick is secured. By the construction described the flame from the top of the wick is left entirely free and unobstructed, the trimming of the same without interfering with the resistance-wire is permitted, and the resistance-wire protected by the wick-tube from displacement.

The electric current for heating the resistance-wire is generated by an electric battery in the receptacle A. The negative element is composed of a plate or plates of carbon $g$, attached at their upper ends to the plug $d$ and extending downwardly into the battery fluid $g'$. The opposite element is composed of a zinc plate $g^2$, attached to the end of an operating-rod $g^3$, which extends upwardly through the cap $a'$ of the receptacle and the head $a^2$ and is provided with a knob $g^4$ at its upper end. The rod is spring-actuated in upward direction by a spring $h$, located in a tube $h'$, passing through the cap $a'$ and plug $d$ and insulated from the latter, said spring being retained between a plug $h^2$ at the lower end of the tube through which the rod passes and a washer $h^3$, secured to the rod within the tube. By the spring the rod is raised, and thereby the zinc lifted and maintained out of the battery solution. When the rod is depressed, the zinc is thereby lowered into the solution and the electric current generated. The course of the current is through the zinc plate $g^2$, rod $g^3$, head $a^2$, stem $a^3$, lamp-body, burner, post $i^2$, resistance-wire, conductor $f$, upper contact-piece, lower contact-piece, conductor $d^4$, bolt $d'$, plug $d$, carbon or carbons $g$, and the battery fluid. The resistance-wire is heated by the current and ignites the wick, the flame from which then continues to burn, consuming the fuel in the lamp-body B until blown out or otherwise extinguished. The rod is released as soon as the wick is ignited.

It is obvious that the receptacle, stem, and lamp-body may be of any desired shape or size and either plain or ornamental.

Having thus described my invention, I claim as new and desire to secure by Letters Patent—

1. In a lamp, the combination, with a suitable battery-receptacle, and an electric battery therein, of a cap on said receptacle, a head on said cap, a stem extending from said head, a lamp-body secured to said stem, a burner screwing into said lamp-body, a base arranged horizontally on said lamp-body at the upper end of the same, a clamping-plate, screws securing said plate to said base, an insulated contact-pin clamped in vertical position between said base and plate, and extending upwardly above the same, a conducting-wire attached to said pin and extending from the same to the battery, a base arranged horizontally on said burner, a clamping-plate, screws securing said plate to said base, a contact-piece, of spring metal, composed of an insulated upper portion clamped in approximately vertical position between said base and plate, and a lower portion extending horizontally from said upper portion and curved concentrically with the burner, a resistance-wire supported on the burner adjacent the wick, and a conductor connecting said resistance-wire with the insulated upper portion of said contact-piece, substantially as set forth.

2. In a lamp, the combination, with a suitable battery-receptacle, and an electric battery therein, of a lamp-body, a burner for the same, a wick-tube extending vertically through said burner, a wick in the wick-tube, a post attached to said wick-tube, a guard attached to said wick-tube, an insulated conductor in said guard, said wick-tube being provided in its side wall between said post and the upper end of the conductor with a notch extending downwardly from the upper end of the tube, and a resistance-wire extending between said post and conductor and in contact with or adjacent said wick at the notch, substantially as set forth.

In testimony that I claim the foregoing as my invention I have signed my name in presence of two subscribing witnesses.

CHARLES E. GERVAIS.

Witnesses:
JOSEPH H. NILES,
HENRY SUHRBIER.